Oct. 15, 1968  R. A. SPYRA  3,405,862
PLASTIC CONTAINER
Filed Sept. 27, 1966  2 Sheets-Sheet 1
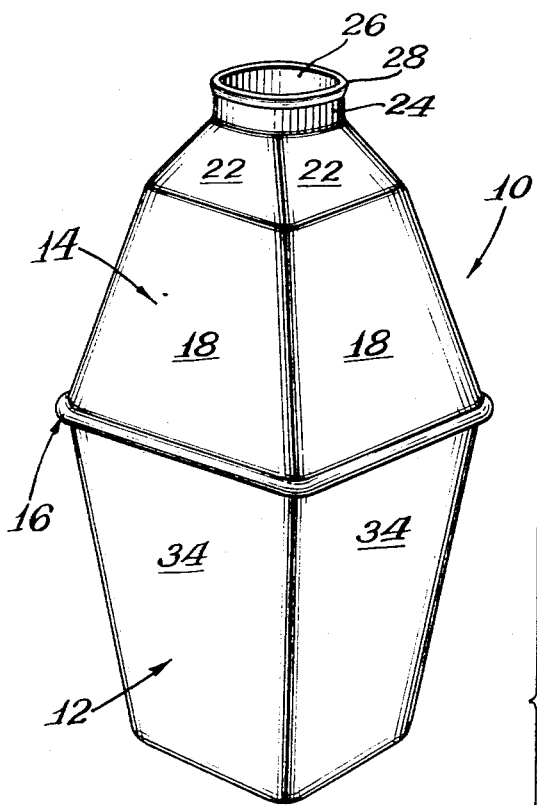
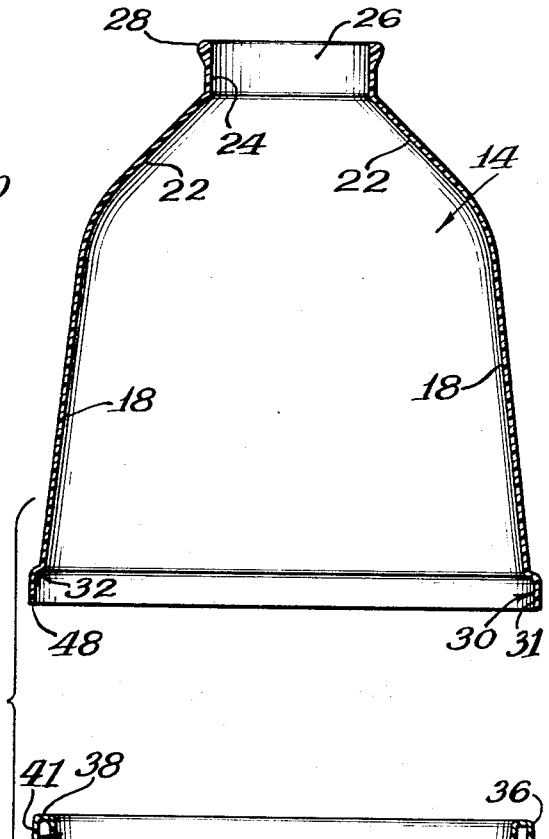
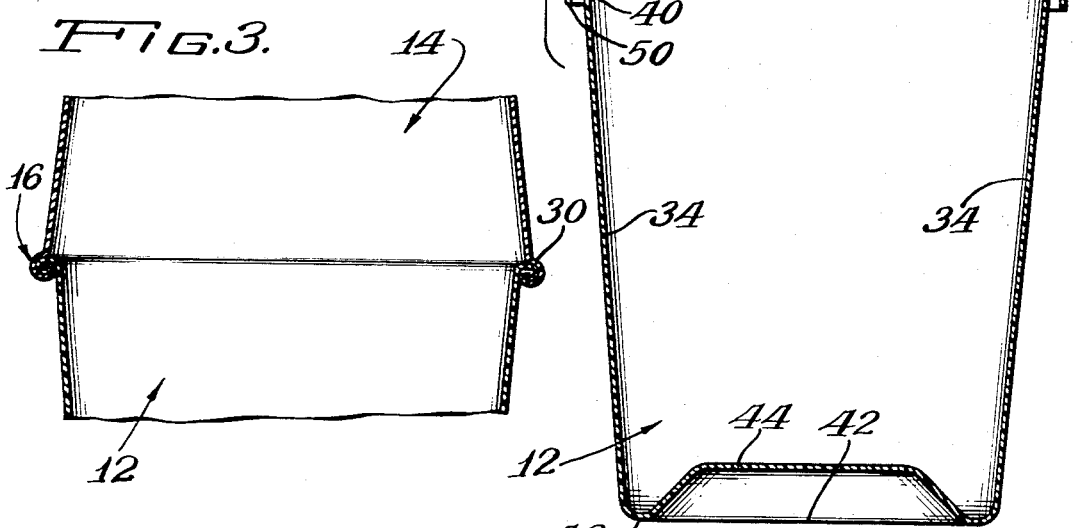
Inventor:
Rudolf A. Spyra
By Bair, Freeman
& Molinare
Attys.

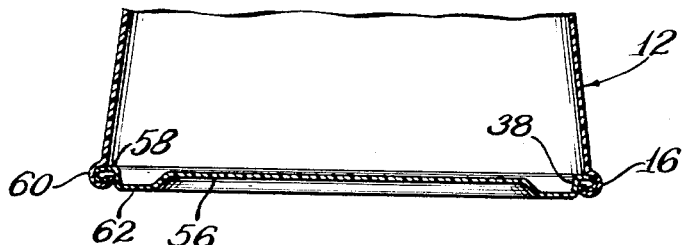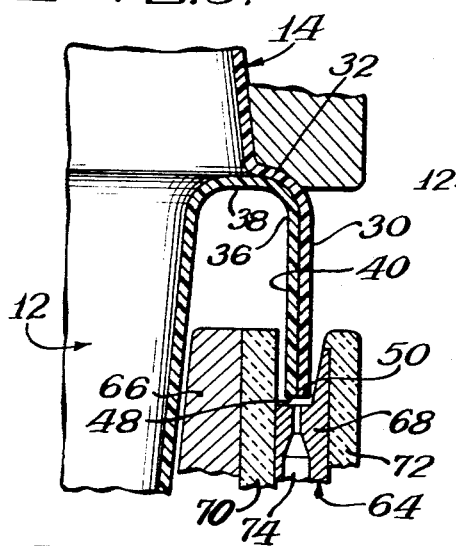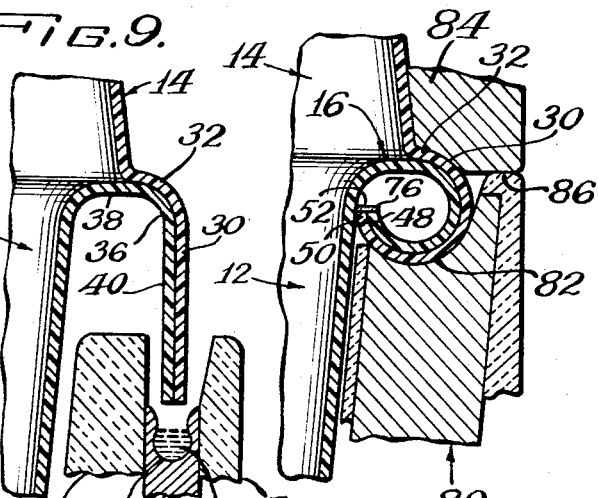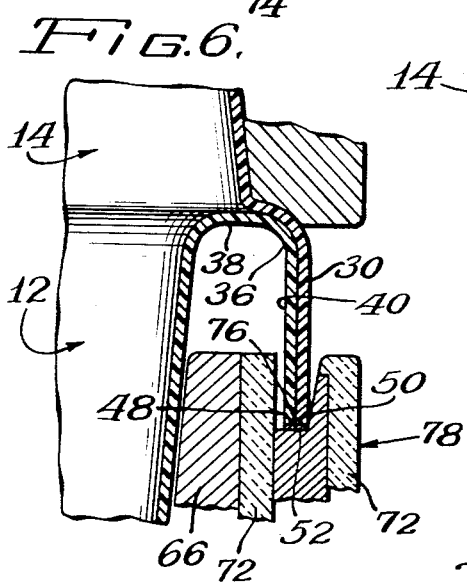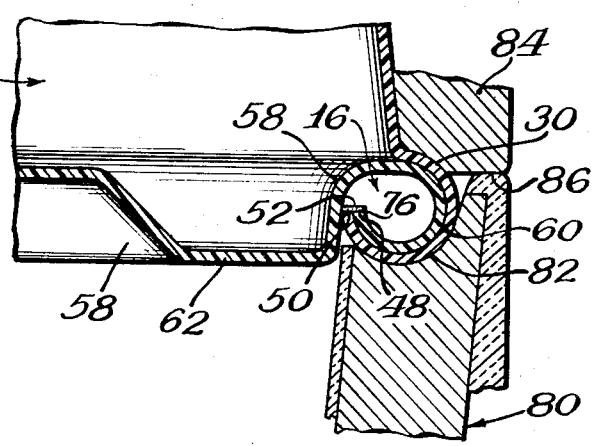

United States Patent Office 3,405,862
Patented Oct. 15, 1968

3,405,862
PLASTIC CONTAINER
Rudolf A. Spyra, c/o Burghof Engineering & Manufacturing Co., 1720 W. Diversey, Chicago, Ill. 60614
Filed Sept. 27, 1966, Ser. No. 582,434
4 Claims. (Cl. 229—5.6)

ABSTRACT OF THE DISCLOSURE

A plastic container comprising a first container portion and a second container portion. The first container portion has a wall tapered to permit stacking of a plurality of said first portions and a peripheral flange is provided on the first container portion. The flange has a mating surface portion and an edge. The second container portion has a peripheral flange also having a mating surface portion and an edge. The edges of each of the flanges are in adjoining and aligned relationship and the mating surfaces are also in adjoining relationship. A seal is formed only at the juncture between the adjoining aligned edges and the mating surfaces to rigidly and sealably join the first container portion to the second container portion.

---

This invention relates to an improved plastic container and to a unique method for making such containers.

Plastic bottles and containers of various types have come into more and more use in the last several years. As an example, one place where plastic containers have come into increased use is use as consumer milk containers. One of the most commonly used methods of forming plastic bottles is by blow molding. One disadvantage of containers made by blow molding is that they require a considerable amount of storage space and shipping space since the bottles cannot be stored or shipped in stacked relationship. Furthermore, it is extremely difficult to provide a uniform wall thickness for blow molded containers.

In order to avoid certain disadvantages of blow molded bottles, another method used to make plastic containers has been to initially form the container in two parts. Each part generally includes an outwardly projecting peripheral flange which mates with a similar flange on the other half. The flanges are then heat sealed or fused together to provide the desired container. Containers made in this way have not proven to be satisfactory since the period of time required to perform the heat sealing operation has been excessive and costly. Furthermore, heat sealing often produces burning and/or curling of the flanges, which is unsightly and makes the containers unsatisfactory for use as containers for milk or other liquids for human consumption.

Still another method used for forming plastic containers is to make the two container halves, wherein the container halves have overlapping flanges. The flanges are then joined together by spin welding, that is, one half of the flange is spun at a high speed relative to the other flange so as to heat seal the two flanges together by fusion. Spin welding techniques are considered unsatisfactory since the method is limited to the production of round containers. Furthermore, spin welding requires special equipment which is too costly and too expensive to be used in the plant of the ultimate user of the container, as a dairy.

In making container halves so that they can be shipped in stacked relationship so as to save storage and shipping expenses, it is important that the techniques used to complete the construction may be done by relatively unskilled personnel of the ultimate user. Thus, the construction process should be simple in operation and yet well constructed, good appearing containers are to be ultimately produced. The spin welding technique is particularly deficient in this regard.

It is therefore an important object of this invention to provide an improved plastic container wherein certain disadvantages associated with prior art constructions are substantially avoided.

It is also an object of this invention to provide an improved plastic container which is initially formed in two halves so that each half may be shipped and stored in a stacked condition.

It is a further object of this invention to provide an improved plastic container of almost any geometrical cross-section formed from two halves wherein the halves are readily joined together in sealing relationship of rigid connection to provide a strong container of pleasing appearance.

It is yet another object of this invention to provide an improved plastic container which is particularly characterized by its simplicity and economy of construction and manufacture.

It is another important object of this invention to provide an unique method for the production of plastic containers which method may be readily accomplished by relatively unskilled personnel.

It is still another object of this invention to provide an improved process for constructing a plastic container from two parts wherein the process is particularly characterized by its simplicity and economy of operation and by the economy and simplicity of the construction of equipment used to practice the process.

Further purposes and objects of this invention will appear as the specification proceeds.

Particular embodiments of the present invention are illustrated in the accompanying drawings wherein:

FIGURE 1 is a perspective view of one embodiment of my improved plastic container construction;

FIGURE 2 is a vertical cross-sectional view through the spaced upper and lower halves of the container construction of FIGURE 1, prior to the connection of the upper half to the lower half;

FIGURE 3 is a fragmentary, vertical cross-sectional view showing the area of connection between the upper and lower halves of the plastic container construction of FIGURE 1;

FIGURE 4 is a fragmentary, vertical cross-sectional view of an alternate embodiment of our improved container construction, wherein the lower portion of the container is substantially flat and is heat sealed to the upper portion of the container;

FIGURE 5 is a fragmentary, cross-sectional view showing one method used to join the flanges of my plastic container construction;

FIGURE 6 shows an alternate method for joining the flanges of my plastic container construction;

FIGURE 7 is a fragmentary, cross-sectional view showing the step of curling the joined flanges together to provide a highly rigid connection between the container halves;

FIGURE 8 is a view similar to FIGURE 7 except that it shows the formation of the curled flange of the embodiment of FIGURE 4; and FIGURE 9 shows still another method for joining the flanges of my plastic container together.

Referring to FIGURE 1, my container construction 10 includes a lower or base half 12 and an upper or top half 14. The lower half 12 and the top half 14 are joined together by an intermediate flanged portion 16.

Referring particularly to FIGURES 1 and 2, the upper half 14 is substantially square in horizontal or transverse cross-section and has four outer walls 18 which are tapered inwardly and upwardly from a lower peripheral flange 30 so as to define an upper wall composed of intersecting walls. The upper portions 22 of the walls 18 are tapered inwardly at a more acute angle than the lower portions of the wall 18. The upper portions 22 terminate at an upstanding cylindrical neck portion 24, which defines an opening 26 in the upper end of the top half 14. A raised peripheral lip 28 is provided around the upper end of the neck 24 so as to firmly receive a cap (not shown) thereon.

In FIGURE 2, the container 10 is shown prior to the assembly of the lower half 12 to the upper half 14. Prior to assembly, the top half 14 of the container 10 includes the lower peripheral flange 30. The flange 30 constitutes an outwardly stepped or raised wall which defines a peripheral stop portion 32 between the outwardly stepped flange 30 and the walls 18. The flange 30 includes a mating surface portion 31. It is important that a plurality of container halves be placed in stacking relation so as to greatly reduce space required for shipping and storage.

The lower container half 12 shown in FIGURE 2 is similar in construction to the top half 14 and substantially square in cross-section. The half includes downwardly and inwardly tapered walls 34 which extend from an upper flange 36. The upper flange includes an outwardly projecting portion 38 and an integral downwardly projecting flange or skirt 40, which includes an outer mating surface portion 41 which is designed to move into surface contact with the mating surface portion 31 of the flange 30. At the lower end of the container half 12 is a closed base portion 42. The base 42 constitutes an upwardly recessed central portion 44 which defines an annular portion 46 adapted to rest firmly upon the flat surface. The lower half 12 is also constructed so that a plurality of such containers may be stacked together.

The upper flange 36 and the downwardly projecting lip 40 thereof are dimensioned so as to be slidably received within and in sliding abutting relationship with the lower flange 30. The entire periphery of the outwardly projecting portion 38 of the upper flange 36 is constructed to abut against the entire periphery of stop portion 32 defined intermediate the lower flange 30 and the walls 18 and the surfaces 31 and 41 are in mating or contacting relationship. It is further important that the lower edge 48 of the flange 30 on the upper half 14 is to be in substantial alignment with the lower edge 50 of the downwardly projecting skirt 40 of the flange 36 on the lower half 12. The edges 48 and 50 are in adjoining relationship for their entire periphery since a seal 52 is provided only at the juncture between the two edges 48 and 50 and the two mating surfaces 31 and 41.

Preferably, after the formation of the seal 52, the flange 30 and the downwardly projecting skirt 40 are curled inwardly towards the lower container half 12, as shown in FIGURE 3, to provide the arcuate flanged connecting portion 16. The formation of the arcuate flange portion 16 is important since it provides for a highly rigid connection between the upper and lower container halves 14 and provides a strong container.

In an alternate construction, the upper container half 14 may be joined directly to a substantially flat base portion 56, as shown in FIGURE 4. In this embodiment, the base portion 56 includes a flange 58 having substantially the same construction as the flange 36 on the lower container half 12 of FIGURES 1 and 2. As in the embodiment of FIGURES 1–3, the flange 58 has the entire periphery of its lower edge in sealing engagement with edge 48 of the flange 30. Also the sealed flange portions are then curled inwardly towards the base portion 56 to provide the arcuate flange 60. The flange 60 is to be positioned above the annular portion 62 of the base 56 so that the container 10 rests firmly upon a flat surface.

My unique method for forming the container 10 may be clearly understood by particular reference to FIGURES 5–8. The first step in forming my container construction 10 is to slidably move the lower container half, as 14, into sliding engagement with the upper container half 12. The lower flange 30 of the upper container half thereby surrounds the upper flange 36 of the lower container half 12. The outwardly projecting portion 38 of the flange 36 is placed into snug abutting engagement with the entire periphery of the stop portion 32 at the juncture of the walls 18 and flange 30. When peripheral abutment is made between the outwardly projecting portion 38 and the stop portion 32, the surfaces 31 and 41 are in contacting relationship and the edges 48 and 50 are in aligned and adjoining relationship along the entire outer periphery of the container. It is important that the edges be in this relationship for providing a proper seal between the upper and lower container halves 14 and 12.

In the embodiment of FIGURE 5, a sealing tool 64 is brought up to the lower edges 48 and 50 along the entire periphery of the container. The tool 64 includes a support portion 66 which is separated from the heated working portion 68 by insulation 70. Insulation 72 also covers the outer surface of the heated working portion 68. In the embodiment of FIGURE 5, a plurality of upwardly projecting ducts 74 are provided in the portion 68 for imparting hot air against the lower edges 48 and 50 to melt the same and form an integral mass 76 which acts as the seal. In the embodiment of FIGURE 6, the tool 78 itself is heated and no ducts are used. In the embodiment of FIGURE 6, a similar unitary mass 78 is formed to provide for the desired seal. Other than the lack of ducts in the tool 78, the construction of the tool 78 is substantially the same as the tool 64.

FIGURE 9 illustrates another method for forming the seal 52. The edges 48 and 50 are inserted into a molten metal bath 71, as tin, contained within a trough 73 formed in a heated metal annular member 75. Insulating members 77 are defined on opposite sides of the member 75. The molten bath 71 heats the plastic edges 48 and 50 to form the desired seal 52.

It is an important aspect of the preferred form of the invention that after the formation of the seal 52 at the juncture between the edges 48 and 50 and the mating surfaces 31 and 41 that the flanges be turned or curled inwardly toward the lower container half 12 to provide for a rigid connection therebetween. The manner of accomplishing this curling operation is shown best in FIGURES 7 and 8 wherein a tool 80 having a concave arcuate upper edge 82 is brought upwardly against the seal 52 between the edges 48 and 50. Pressure is then applied in an upward direction against the edges 48 and 50 so as to cause the edges to be turned or curled inwardly and upwardly in the manner shown. The curling operation is accomplished while the lip 40 and the flange 30 are still in a heated condition so that the operation may be readily accomplished. The beaded or arcuate flange 16 provides a highly rigid connection between the container halves.

In the formation of the arcuate flange a back up tool 84 is preferably placed above and against the stepped flange 30 on the upper half 14 so that the curvature of the flange 16 will be substantially the same for each container made. The upper and outer edge 86 of the curling tool 80 abuts the lower edge of the back up tool 84 as shown in FIGURES 7 and 8 to provide the desired uniform flange curvature. As shown in FIGURES 7 and 8, the formation of the arcuate portion of the flange 16 is precisely the same in both the embodiment of FIGURES 1–3 and in the embodiment of FIGURE 4.

From the foregoing, it is seen that all of the aforementioned objects now have been accomplished. I have provided a container construction which may be initially made in two separate halves or parts, each of the halves being adapted to be stacked together so as to save considerable space during both shipping and storage. Furthermore, by providing downwardly projecting edges on both the upper and lower container halves, and by providing adjoining and aligned edges on each of the flanges, it is possible to heat seal the edges of the flanges only.

By heat sealing the flange edges only, there is little distortion or burning of the flanges at the seal so as to provide a highly pleasing connection therebetween. Even if there is a slight amount of distortion or burning, since the sealed edges is turned inwardly towards the container, any such distortion or scorching will be hidden. Also, the method used for joining the two container halves together may be readily accomplished by unskilled persons. The equipment needed for the assembly operation may be used by the ultimate user, as a dairy, and is relatively inexpensive and simple in construction and operation.

Materials used for the container 10 include styrene and polyethylene of the types approved for use with food products. Both these materials are readily sealed and formed in the described manner to provide all of the important advantages of the claimed invention.

While in the foregoing there has been provided a detailed description of particular embodiments of the present invention, it is to be understood that all equivalents obvious to those having skill in the art are to be included within the scope of the invention as claimed.

What I claim and desire to secure by Letters Patent is:

1. A plastic container comprising a first container portion having a wall tapered to permit stacking of a plurality of said first portions, a peripheral flange on said first container portion, said flange having a mating surface portion and an edge, a second container portion having a peripheral flange, said flange of said second container portion also having a mating surface portion and an edge, said edges of said flanges being in adjoining and aligned relationship, said mating surfaces being in adjoining relationship, and a seal formed only at the juncture between said adjoining aligned edges and said mating surfaces to rigidly and sealably join said first container portion to said second container portion.

2. The article of claim 1 wherein said flanges are arcuate and said seal is adjacent one of said container portions.

3. The article of claim 2 wherein said second portion is a substantially flat base.

4. The article of claim 2 wherein said second portion has tapered walls to permit stacking of a plurality of said second portions, said second portion also having a closed base portion, and said first container portion includes an opening.

References Cited
UNITED STATES PATENTS 2,099,055 11/1937 Ferngren _____ 229—3.5
3,142,422 7/1964 Mojonnier _____ 150—0.5

DAVID M. BOCKENEK, *Primary Examiner.*